United States Patent
Heid et al.

(10) Patent No.: US 6,649,706 B1
(45) Date of Patent: Nov. 18, 2003

(54) THIXOTROPING AGENT

(75) Inventors: Ingrid Heid, Münster (DE); Helmut Kleine Beckmann, Ostbevern (DE); Ulrike Röckrath, Senden (DE); Hubert Baumgart, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/926,518

(22) PCT Filed: May 6, 2000

(86) PCT No.: PCT/EP00/04082

§ 371 (c)(1),
(2), (4) Date: Nov. 14, 2001

(87) PCT Pub. No.: WO00/71625

PCT Pub. Date: Nov. 30, 2000

(30) Foreign Application Priority Data

May 25, 1999 (DE) ......................................... 199 24 170

(51) Int. Cl.⁷ .............................................. C08G 18/02
(52) U.S. Cl. ........................ 525/452; 525/131; 524/196; 524/507; 528/45; 528/64; 528/68
(58) Field of Search ................................ 525/131, 452; 528/64, 73, 69; 524/507, 196, 211, 212; 427/385.5, 388.2, 407.1, 409

(56) References Cited

U.S. PATENT DOCUMENTS

| | | | |
|---|---|---|---|
| 3,547,848 A | 12/1970 | Marsh et al. | 260/22 |
| 3,893,956 A | 7/1975 | Brandt | 260/18 |
| 4,169,930 A | 10/1979 | Blount | 528/38 |
| 4,311,622 A | 1/1982 | Buter | 524/542 |
| 4,383,068 A | 5/1983 | Brandt | 524/196 |
| 4,416,941 A | 11/1983 | Barsotti | 428/328 |
| 4,425,468 A | 1/1984 | Makhlouf et al. | 524/710 |
| 4,522,958 A | 6/1985 | Das et al. | 523/212 |
| 4,528,319 A | 7/1985 | Ottaviani et al. | 524/540 |
| 4,677,028 A * | 6/1987 | Heeringa et al. | 428/422.8 |
| 4,762,752 A | 8/1988 | Haubennestel et al. | 428/407 |
| 4,851,460 A | 7/1989 | Stranghöner et al. | 523/407 |
| 4,965,317 A | 10/1990 | Kania et al. | 525/155 |
| 5,264,486 A | 11/1993 | Piestert | 524/745 |
| 5,391,620 A | 2/1995 | Bederke et al. | 525/123 |
| 5,468,461 A | 11/1995 | Hosoda et al. | 523/435 |
| 5,977,256 A | 11/1999 | Huybrechts et al. | 525/131 |
| 6,111,001 A * | 8/2000 | Barancyk et al. | 524/211 |
| 6,403,699 B1 * | 6/2002 | Rockrath et al. | 524/556 |
| 6,410,646 B1 | 6/2002 | Röckrath et al. | 525/124 |

FOREIGN PATENT DOCUMENTS

| | | | |
|---|---|---|---|
| DE | 43 10 413 A1 | 10/1994 | C09D/133/04 |
| DE | 44 23 260 | 4/1996 | C04B/24/12 |
| DE | 198 11 471 | 9/1999 | C08G/18/64 |
| DE | 198 55 152 | 5/2000 | C08G/18/80 |
| DE | 199 24 171 | 11/2000 | C09D/5/04 |
| DE | 199 24 172 | 11/2000 | C09D/5/04 |
| DE | 101 18 532 | 10/2002 | C09D/5/04 |
| EP | 0 038 127 | 3/1981 | B05D/7/26 |
| EP | 0 154 678 A1 | 10/1984 | C08G/18/80 |
| EP | 0 249 201 | 6/1987 | C09D/3/58 |
| EP | 0 276 501 | 9/1987 | C11D/1/42 |
| JP | 60120750 | 12/1983 | C08L/75/04 |
| WO | WO 99/05194 | 2/1999 | C08G/18/74 |
| WO | WO 00/32670 | 6/2000 | C08G/18/80 |

OTHER PUBLICATIONS

BASF English Patent Application No. 09/856,773 filed Nov. 15, 1998, Entitled Coating composition and process its preparation pp. 1–49 and Abstract. (IN–5498).
BASF English Patent Application No. 09/926,526 filed Nov. 14, 2001, entitled Coating material Featuring a mixture comprising at least one wetting agent and ureas and/or derivatives as thixotropic agents, pp. 1–60 (5537).
Baumgart, et al, USSN 09/926,533 filed Nov. 18, 2001, entitled Coating material featuring a mixture comprising silicas and urea and/or urea derivatives, pp. 1–50. (5536).
BASF English Patent Application No. 09/463,054 filed Jul. 13, 1998, Entitled "Coating composition and process its preparation", pp. 1–51 and Abstract. (5379).
BASF English Patent Application No. 09/779,948 filed Feb. 9, 2001, Entitled "Method of improving the appearance of coating articles having both vertical and horizontal surfaces, and coating compositions for use therein", pp. 1–52. (5436).
English Translation on front page of the International Publication WO 00/32670.
English Translation on front page of the International Publication WO 99/05194.
English Language Abstract for DE 198 11 471 from EPO, Sep. 23, 1999.
English Language Abstract for DE 44 23 260 from EPO, Jan. 4, 1996.
English Language Abstract for JP64024851 from JPO, Jan. 26, 1989.
Derwent Accession No. 1989–072706, abstract for JPO1024851, Jan. 26, 1989.
Derwent Accession No. 2002–811780, abstract for DE10118532, Oct. 24, 2002.
Patent Abstract of Japan, JP09203115, Mitsubishi Gas Chem Co. Inc., by Kono Yutaka, entitled "Printing Ink Binder", Jul. 29, 1997 on 1 page.

* cited by examiner

Primary Examiner—David W. Wu
Assistant Examiner—Satya Sastri

(57) ABSTRACT

A thixotroping agent comprising a reaction product of a isocyanto-containing compound and an amine. The isocyanto-containing compound comprises at least one of Ia) at least one isocyanate with at least one diisocyanate structural unit that has an unsaturated/aromatic or non-aromatic ring structure with 5–10 ring atoms and two isocyanate groups that are bound to the ring structure; Ib) at least one oligomer of the isocyanate Ia) with 2 to 10 isocyanate units; and Ic) at least one partially blocked isocyanate Ia) and/or at least one partially blocked oligomer Ib).

16 Claims, No Drawings

THIXOTROPING AGENT

This application is a National Phase Application of Patent Application PCT/EP00/04082 filed on May 6, 2000.

The invention relates to a thixotropic agent obtainable from the reaction of an isocyanato-containing component with a primary or secondary amine or a mixture of such amines and/or water, to the use of such a thixotropic agent, and to a process for preparing such a thixotropic agent.

Coating materials with thixotropic agents are known. The literature references EP-A-192 304, DE-A-23 59 923, DE-A-18 05 693, WO 94/22968, and DE-C-27 51 761 describe coating materials comprising urea derivatives as thixotropic agents. Moreover, for example, the literature references WO 97/12945 and "farbe+lack", 11/1992, pages 829 ff. describe coating materials which comprise modified, hydrophilic or hydrophobic silicas as thixotropic agents. In this literature reference, urea derivatives are also mentioned in passing as an alternative. Finally, the literature reference DE-A-37 26 959 discloses coating materials comprising urea in dissolved form. Since the urea is dissolved, it cannot play the part of a thixotropic agent.

The use of thixotropic agents in coating materials is intended, among other things, to allow the application of comparatively thick paint films without disruptive running. Especially in the case of nonaqueous paints which comprise a thixotropic agent based on urea derivatives, at high solids contents in any case, coating materials and paint surfaces are obtained which do not meet all of the requirements.

A key feature of thixotropic agents is that the viscosity of a paint prepared using them depends on the prior flow history and/or that the thixotropic agents are pseudoplastic, i.e., the viscosity of the paint decreases as the applied shear stress goes up. Starting from a base line viscosity, the viscosity decreases under shear stress and returns only gradually to the initial level after the shear stress has ended. A thixotropic gel, for example, liquefies as a result of input of mechanical energy (stirring or the like) and solidifies only gradually after the end of the input of energy. Pseudoplastic or thixotropic properties are advantageous for paint processing. In particular, the tendency of a paint to run on application at high wet-film thickness may be controlled and reduced. On the other hand, thixotropic agents must not adversely affect the optical and chemical properties of a finished coating produced using them. As a general rule, thixotropic agents are particulate and are present in dispersion in a coating material, whether aqueous or nonaqueous. In the case of the urea derivatives, these thixotropic agents are acicular crystals, in part with a helical twist, for which, preferably, a particle size distribution between 0.1 $\mu$m and 6 $\mu$m (95–99% of the particles, based on the volume) is set and 80% of the crystals (based on the number) are smaller than 2 $\mu$m.

The invention is therefore based on the technical problem of indicating a thixotropic agent which is obtainable by reaction of an isocyanate, especially a diisocyanate, with primary or secondary amines or a mixture of such amines and/or water and with which in coating materials a markedly reduced tendency toward running is achieved, and a coating obtained with such a coating material meets all of the requirements.

In order to solve this technical problem the invention teaches the use

Ia) of at least one isocyanate containing at least one diisocyanate structural unit which
  i) has an unsaturated or aromatic or nonaromatic ring structure containing 5–10 ring atoms and
  ii) has two isocyanate groups attached to the ring structure, where
  iii) in the case of a nonaromatic ring structure
    a) both isocyanate groups are attached to the ring structure via linear $C_1$–$C_9$ alkyl and/or linear $C_2$–$C_{10}$ ether alkyl, or
    b) one isocyanate group is attached directly to the ring structure and the other is attached via linear $C_2$–$C_9$ alkyl and/or linear $C_2$–$C_{10}$ ether alkyl, and
  iv) in the case of an unsaturated aromatic ring structure at least one of the two isocyanate groups is attached to the ring structure via linear $C_2$–$C_9$ alkyl and/or linear $C_2$–$C_{10}$ ether alkyl, both of which radicals contain no benzylic hydrogen atoms;

and/or

Ib) of at least one oligomer of this isocyanate Ia) containing from 2 to 10 isocyanate units, especially a trimer;

and/or

Ic) of at least one partially blocked isocyanate Ia) and/or of at least one partially blocked oligomer Ib)

for preparing the thixotropic agents.

Surprisingly, the use of the isocyanate component used in accordance with the invention leads to a thixotropic agent which has optimum properties in terms of thixotropy and gives rise to coatings, especially clearcoats, which satisfy all of the requirements, especially leveling and gloss. On vertical substrate surfaces, dry film thicknesses of up to 50 $\mu$m or more may be produced without running. The isocyanato-containing components of the invention may further comprise, in principle, isocyanates of customary structure that are described below.

One preferred embodiment of the invention is characterized in that the thixotropic agent is obtainable by reacting the isocyanato-containing component with an aliphatic, primary monoamine.

Although further isocyanates may be present, it is preferred for the isocyanato-containing component to be formed by the compounds Ia and/or Ib and/or Ic).

The invention further teaches the use of a thixotropic agent of the invention for preparing a coating material, preferably a nonaqueous coating material, very preferably a nonaqueous gloss clearcoat material. The coating material may be a one-component or a two-component or multicomponent system.

In the context of the present invention, a one-component (1K) system is a thermally curing coating material wherein the binder and the crosslinking agent are present alongside one another, i.e., in one component. A prerequisite for this is that the two constituents crosslink with one another only at relatively high temperatures and/or on exposure to actinic radiation.

In the context of the present invention, a two-component (2K) or multicomponent (3K, 4K) system is a coating material wherein in particular the binder and the crosslinking agent are present separately from one another in at least two components which are not combined until shortly before application. This form is chosen when binder and crosslinking agent already react with one another even at room temperature. Coating materials of this kind are employed above all to coat thermally sensitive substrates, especially in automotive refinish.

In the context of the use it is preferred if the coating material comprises at least one binder, preferably a polyacrylate resin, at least one crosslinking agent, preferably selected from the group consisting of polyisocyanates, polyepoxides, blocked polyisocyanates, tris (alkoxycarbonylamino)triazines, amino resins, beta-hydroxyalkylamides, siloxanes and polyanhydrides, and mixtures of these compounds the one according to the invention, and, optionally, coatings additives.

The invention relates finally to a process for preparing a thixotropic agent of the invention, where a) the primary or secondary amine or a mixture of such amines and/or water is added to a binder solution, preferably a nonaqueous polyacrylate solution, and b) the isocyanato-containing component or a solution of this component is added to the solution obtained in step a).

In detail, steps a) and/or b) may be conducted in a dissolver.

The thixotropic agent may be used in the coating material in an amount of from 0.1 to 5.0% by weight, preferably from 0.2 to 2.5% by weight, most preferably from 0.6 to 1.8% by weight, based on the overall solids content of the coating material.

The amines and the polyisocyanato-containing component may be reacted with one another in amounts such that the equivalents ratio between amino groups and isocyanate groups is between 1.2 and 0.4, preferably between 1.0 and 0.8.

Monoamines used are preferably monoamines, with particular preference araliphatic or aliphatic primary monoamines, with very particular preference aliphatic primary monoamines having at least 6 carbon atoms in the molecule. Examples of monoamines which can be used include: benzylamine, ethylamine, n-propylamine, isopropylamine, n-butylamine, isobutylamine, tert-butylamine, pentylamine, n-hexylamine, n-octylamine, iso-nonylamine, iso-tridecylamine, n-decylamine and stearylamine. It is also possible to use primary and secondary amines containing ether groups. These are substances of the general formula $(CH_3-(CH_2)_a-O-(CH_2)_b)_c NH_d$, where a is an integer from 0 to 10, b is an integer from 1 to 20, c is 1 or 2 and the sum of c and d is always 3. Preferably, a=0, b=3, c=1 and d=2.

For the polyisocyanates used additionally in the isocyanato-containing component, it is possible in principle to use all organic compounds containing at least two isocyanate groups per molecule. It is also possible to use isocyanato-containing reaction products of, for example, polyols and polyamines and polyisocyanates. Preference is given to using diisocyanates, with very particular preference aliphatic diisocyanates, especially hexamethylene diisocyanate. Example of polyisocyanates which can be used include: tetramethylene 1,4-diisocyanate, hexamethylene 1,6-diisocyanate, omega,omega'-dipropyl ether diisocyanate, cyclohexyl 1,4-diisocyanate, dicyclohexylmethane 4,4'-diisocyanate, 1,5-dimethyl-2,4-di(isocyanato-methyl)benzene, 1,5-di-methyl-2,4-di-(isocyanatoethyl)benzene, 1,3,5-trimethyl-2,4-di-(isocyanatomethyl)benzene, 1,3,5-triethyl-2,4-di-(isocyanatomethyl)benzene, the trimer of hexamethylene 1,6-diisocyanate, isophorone diisocyanate, dicyclohexyl-dimethylmethane 4,4'-diisocyanate, 2,4-tolyl diisocyanate, 2,6-tolylene diisocyanate, diphenylmethane 4,4'-diisocyanate. Further examples of suitable polyisocyanates and diisocyanates are listed below for the polyisocyanates and diisocyanates used as crosslinking agents.

The isocyanate Ia) for use in accordance with the invention contains at least one diisocyanate structural unit having a specific structure. Although the isocyanate Ia) may contain two or more of these diisocyanate structural units, it has been found appropriate to use only one.

Regarding the diisocyanate structural unit of the diisocyanate Ia) there are various possibilities for its further configuration, which are described below.

As far as the ring structure (i) is concerned it is possible in principle for the rings involved to be heteroatomic rings. In that case the ring structure (i) includes not only carbon atoms but also ring atoms other than carbon, such as nitrogen, oxygen or silicon atoms, for example. The rings involved may be saturated or unsaturated, or aromatic, heteroatomic rings. Examples of suitable saturated heteroatomic rings are the silacyclopentane, silacyclohexane, oxolane, oxane, dioxane, morpholine, pyrrolidine, imidazolidine, pyrazolidine, piperidine or quinuclidine rings. Examples of suitable unsaturated or aromatic heteroatomic rings are pyrrole, imidazole, pyrazole, pyridine, pyrimidine, pyrazine, pyridazine or triazine rings. It is preferred if the ring structure (i) contains exclusively carbon atoms.

The ring structure (i) may on one hand be free from bridges. Where the ring structure (i) is a bicyclic terpene structure, decalin, adamantane or quinuclidine, however, bridges may be present. Examples of suitable terpene structures are carane, norcarane, pinane, camphane or norbornane structures.

The hydrogen atoms of a diisocyanate structural unit Ia), especially the ring structure (i), may be substituted by groups or atoms which react neither with isocyanates nor with the amine and/the binder. Examples of suitable groups are nitro, alkyl, cycloalkyl, perfluoroalkyl, perfluorocycloalkyl or aryl groups. Examples of suitable atoms are halogen atoms, especially fluorine.

The ring structure (i) consists advantageously of 6 carbon atoms, especially in the form of cyclohexane or benzene.

Examples of suitable linear $C_1-C_9$ alkyl are methylene or ethylene radicals and also tri, tetra-, penta-, hexa-, hepta-, octa- or nonamethylene radicals, especially methylene radicals.

The linear $C_2-C_{10}$ ether alkyls are attached to the ring structure either via the oxygen atoms or via the alkanediyl radicals they contain. Preferably, they are attached to said structure via the oxygen atoms. The indices 2 to 10 denote that there are from 2 to 10 carbon atoms in the ether alkyls.

The ether alkyls may contain only 1 oxygen atom. It is of advantage if from 2 to 10, in particular from 2 to 5, oxygen atoms are present in the chain. In that case there are 1 or more, but especially 2, carbon atoms between 2 oxygen atoms.

Examples of suitable $C_2-C_{10}$ ether alkyls are

—$(O-CH_2)_m$—, where m=1 to 10,

—$(O-C_2H_4)_p$—, where p=1 to 5,

—$(O-C_3H_6)_q$—, where q=1 to 3, or

—$(O-C_4H_8)_r$—, where r=1 to 2.

If the isocyanate Ia) contains at least one diisocyanate structural unit having a nonaromatic ring structure (i), especially cyclohexane, both isocyanate groups may be attached via —$CH_2$—, preferably to positions 1 and 3 of the ring structure. Attachment to the 1,2 and 1,4 positions, however, is also possible.

In that case the diisocyanate structural unit or the isocyanate Ia) has, for example, the formula $C_6H_{10}$ (—$CH_2$—$NCO)_2$.

Alternatively, it is possible for one of the two isocyanate groups to be attached directly to a ring atom of a nonaromatic ring structure (i), especially cyclohexane, and for the second isocyanate group to be attached via $C_2-C_9$ alkyl, especially $C_3$ alkyl, to a further ring atom, preferably in 1,2 configuration. In that case the diisocyanate structural unit or the isocyanate Ia) has, for example, the formula $C_6H_{10}$(—NCO) (—$C_3H_6$—NCO).

If the isocyanate Ia) contains at least one diisocyanate structural unit having an unsaturated or aromatic ring structure (i), especially benzene, both isocyanate groups may be attached to said structure via $C_2$–$C_9$ alkyl. It is important that the alkanediyl radicals contain no benzylic hydrogen atoms, but in their stead carry substituents $R^1$ and $R^2$ which react neither with isocyanates nor with the amine or the binder. Examples of suitable substituents $R^1$ and $R^2$ are $C_1$–$C_{10}$ alkyl, aryl or halogen, preferably —$CH_3$.

Examples of suitable alkanediyl groups are, accordingly, —$CR^1R^2$—$(CH_2)_n$—, where n=1 to 8, especially 1 to 4, and $R^1$ and $R^2$=the substituents indicated above.

The above-described alkanediyl groups are attached preferably to positions 1 and 3 of the benzene ring. In this case as well, however, attachment to positions 1,2 and 1,4 is possible. In that case, the diisocyanate structural unit or the isocyanate Ia) for inventive use has, for example, the formula $C_6H_4$(—$C(CH_3)_2$—$C_2H_4$—$NCO)_2$.

Alternatively, the two isocyanate groups may be connected to the unsaturated or aromatic ring structure, especially benzene, via the above-described $C_2$–$C_{10}$ ether alkyls. It is important that the ether alkyls carry no benzylic hydrogen atoms. Where the ether alkyls are linked to the aromatic ring structure via carbon atoms, this can be achieved by the benzylic carbon atoms carrying the above-described substituents $R^1$ and $R^2$. If the ether alkyls are linked to the aromatic ring structure via oxygen atoms, no benzylic hydrogen atoms are present, which is why this variant is preferred.

Here again, it is possible for one of the two isocyanate groups to be attached directly to a ring atom of an unsaturated or aromatic ring structure (i), preferably a benzene ring, and for the second isocyanate group to be attached to a further ring atom, preferably in 1,2 configuration, via for example $C_3$–$C_9$ alkyl containing no benzylic hydrogen atoms. In that case, the diisocanate structural unit or the isocyanate Ia) for inventive use has, for example, the formula $C_6H_4$(—NCO) (—$C(CH_3)_2$—$(CH_2)_2$—NCO).

Instead of or in addition to the isocyanate Ia), however, it is possible to use at least one oligomer 1b). The oligomer 1b) is prepared from the isocyanate Ia), the reaction involving advantageously 2 to 10 monomer units, and trimerization being particularly preferred. The oligomerization and trimerization may lead, using customary and known, suitable catalysts to the formation of uretdione, biuret, isocyanurate, urea and/or allophanate groups. Oligomerization is, however, also possible by reaction with low molecular mass polyols such as trimethylolpropane or homotrimethylolpropane, glycerol, neopentyl glycol, dimethylolcyclohexane, ethylene glycol, diethylene glycol, propylene glycol, 2-methyl-2-propyl-1,3-propanediol, 2-ethyl-2-butyl-l-propanediol, 3,2,2,4-trimethyl-1,5-pentanediol and 2,2,5-trimethyl-1,6-hexanediol, which, where required, are ethoxylated and/or propoxylated—partly, if desired—or otherwise rendered hydrophilic.

Instead of the isocyanate Ia) and/or of the oligomer Ib) or in addition to these two it is possible to use at least one partially blocked isocyanate Ia) and/or at least one partially blocked oligomer Ib).

Examples of suitable blocking agents are the blocking agents known from the U.S. Pat. No. 4,444,954, such as i) phenols such as phenol, cresol, xylenol, nitrophenol, chlorophenol, ethylphenol, t-butylphenol, hydroxybenzoic acid, esters of this acid or 2,5-di-t-butyl-4-hydroxytoluene; ii) lactams, such as -caprolactam, -valerolactam, -butyrolactam or -propiolactam; iii) active methylenic compounds, such as diethyl malonate, dimethyl malonate, ethyl acetoacetate, methyl acetoacetate or acetylacetone; iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol or acetocyanohydrin; v) mercaptans such as butyl mercaptan, hexyl mercaptan, t-butyl mercaptan, t-dodecyl mercaptan, 2-mercaptobenzothiazole, thiophenol, methylthiophenol or ethylthiophenol; vi) acid amides such as acetoanilide, acetoanisidinamide, acrylamide, methacrylamide, acetamide, stearamide or benzamide; vii) imides such as succinimide, phthalimide or maleimide; viii) amines such as diphenylamine, phenylnaphthylamine, xylidine, N-phenylxylidine, carbazole, aniline, naphthylamine, butylamine, dibutylamine or butylphenylamine; ix) imidazoles such as imidazole or 2-ethylimidazole; x) ureas such as urea, thiourea, ethyleneurea, ethylenethiourea or 1,3-diphenylurea; xi) carbamates such as phenyl N-phenylcarbamate or 2-oxazolidone; xii) imines such as ethyleneimine; xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes; xiv) salts of sulfurous acid such as sodium bisulfite or potassium bisulfite; xv) hydroxamic esters such as benzyl methacrylohydroxamate (BMH) or allyl methacrylohydroxamate or xvi) substituted pyrazoles, imidazoles or triazoles.

The above-described oligomers Ib) or Ic) and trimers Ib) or Ic) advantageously have an NCO functionality of 2.0–5.0, preferably of 2.2–4.0, in particular of 2.5–3.8.

The isocyanates Ia) described above in detail, their oligomers Ib) and/or timers Ib), and/or the compounds Ic) may be the sole compounds for preparing the thixotropic agent or may be used in a mixture with the aforedescribed isocyanates.

The thixotropic agent may be prepared separately or in the presence of the polyacrylate resin used. In the latter case, a common procedure is to add the amine component to a solution of the acrylate resin in an organic solvent or in a mixture of organic solvents and then to add the polyisocyanate very quickly and with very vigorous stirring. The resulting mixture of thixotropic agent containing urea groups and polyacrylate resin may then be used in the coating materials.

In a coating material prepared with the thixotropic agent of the invention there may be further thixotropic agents, an example being silica. The silica may be a modified, pyrogenic, preferably hydrophobic, silica. Hydrophilic and hydrophobic silicas are available commercially, for example, under the trade name Aerosil® and under the product designations 200, R972, R974, R805 and R812 from Degussa AG, Hanau. The silica is used in an amount of from 0.1 to 30% by weight, preferably from 0.5 to 10% by weight, most preferably from 1.0 to 5.0% by weight, based on the overall solids content of the coating material.

In the context of the invention, a very wide variety of binders may be used as principal binders. Principal binders are those binders which, in quantitative terms, have the greatest proportion of any different binders used. Suitable examples include polyacrylates with or without hydroxyl groups, polyesters, polyurethanes, polyepoxides, and alkyd resins, possibly oil-modified. In the case of binders for aqueous paints, the binders contain ionic or nonionic groups which ensure solubility in water or dispersibility in water.

In accordance with the invention, hydroxyl-containing polyacrylates or polyacrylate resins are of advantage and are therefore used with preference.

In the case of the polyacrylates for nonaqueous coating materials, the binder may in particular be a polyacrylate resin which is preparable by polymerizing (a) from 16 to 51% by weight, preferably from 16 to 28% by weight, of a hydroxyl-containing ester of acrylic or methacrylic acid or of a mixture of such monomers, (b) from 32 to 84% by weight, preferably from 32 to 63% by weight, of a non-(a) aliphatic or cycloaliphatic ester of acrylic acid or methacrylic acid having preferably at least 4 carbon atoms in the alcohol residue or a mixture of such monomers, (c) from 0 to 2% by weight, preferably from 0 to 1% by weight, of an ethylenically unsaturated carboxylic acid or of a mixture of ethylenically unsaturated carboxylic acids, and (d) from 0 to 30% by weight, preferably from 0 to 20% by weight, of a non-(a), -(b) and -(c) ethylenically unsaturated monomers, or of a mixture of such monomers, to give a polyacrylate resin having an acid number of from 0 to 15, preferably from 0 to 8, a hydroxyl number of from 80 to 140, preferably from 80 to 120, and a number-average molecular weight of 1500 to 10000, preferably from 2000 to 5000, the sum of the weight fractions of components (a), (b), (c) and (d) always being 100% by weight.

The polyacrylate resins used with preference may be prepared in accordance with polymerization techniques which are common knowledge, in bulk, solution or emulsion. Polymerization processes for preparing polyacrylate resins are common knowledge and are widely described (cf., e.g.: Houben Weyl, Methoden der organischen Chemie, 4th edition, Volume 14/1, page 24 to 255 (1961)).

Further examples of suitable (co)polymerization processes for the preparation of the polyacrylate resins are described in the patents DE-A-197 09 465, DE-C-197 09 476, DE-A-28 48 906, DE-A-195 24 182, EP-A-0 554 783, WO 95/27742, DE-A-38 41 540 or WO 82/02387.

Of advantage are Taylor reactors, especially for copolymerization in bulk, solution or emulsion.

Taylor reactors, which serve to convert substances under the conditions of Taylor flow, are known. They consist substantially of two coaxial concentric cylinders of which the outer one is fixed while the inner one rotates. The reaction space is the volume formed by the gap between the cylinders. Increasing angular velocity $\omega_1$ of the inner cylinder is accompanied by a series of different flow patterns which are characterized by a dimensionless parameter, known as the Taylor number Ta. Besides the angular velocity of the stirrer, the Taylor number is also dependent on the kinematic viscosity v of the fluid in the gap and on the geometric parameters, the external radius of the inner cylinder $r_i$, the internal radius of the outer cylinder $r_o$ and the gap width d, the difference between the two radii, in accordance with the following formula:

$$Ta = \omega_i r_i d \, v^{-1} (d/r_i)^{1/2} \quad (I)$$

where $d = r_o - r_i$.

At low angular velocity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. If there is an increase in the rotary speed, there is also an increase in the centrifugal force. The Taylor vortices are formed when the centrifugal force exceeds the stabilizing viscosity force.

In the case of Taylor flow with a low axial flow, each vortex pair passes through the gap, with only a low level of mass transfer occurring between adjacent vortex pairs. Mixing within such vortex pairs is very high, whereas axial mixing beyond the pair boundaries is very low. A vortex pair may therefore be regarded as a stirred tank in which there is thorough mixing. Consequently, the flow system behaves as an ideal flow tube in that the vortex pairs pass through the gap with constant residence time, like ideal stirred tanks.

Of advantage in this context are Taylor reactors having an external reactor wall located within which there is a concentrically or eccentrically disposed rotor, a reactor floor and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap widens in the direction of flow therethrough.

The polyacrylate resins used are prepared preferably by means of the solution polymerization process. In this case, normally, an organic solvent or solvent mixture is introduced as initial charge and heated to boiling. The monomer mixture to be polymerized, and also one or more polymerization initiators, are then added continuously to this organic solvent or solvent mixture. The polymerization takes place at temperatures between 100 and 160° C., preferably between 130 and 150° C. As polymerization initiators it is preferred to use initiators which form free radicals. The power and amount of initiator are customarily chosen in such a way that the supply of free radicals during the feed phase at the polymerization temperature is very largely constant.

Examples of initiators that can be used include the following: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; azo dinitriles such as azobisisobutyronitrile, or C—C-cleaving initiators such as benzpinacol silyl ethers.

The polymerization conditions (reaction temperature, feed time of the monomer mixture, nature and amount of the organic solvents and polymerization initiators, possible use of molecular weight regulators, such as mercaptans, thioglycolic esters and chlorinated hydrocarbons) are selected d such that the polyacrylate resins employed have a number-average molecular weight of from 1500 to 10000, preferably from 2000 to 5000 (determined by gel permeation chromatography using polystyrene as calibrating substance).

The acid number of the polyacrylate resins used may be adjusted by the skilled worker by using corresponding amounts of component (c). The same applies to the adjustment of the hydroxyl number. This number can be controlled by way of the amount of component (a) employed.

As component (a) it is possible in principle to use any hydroxyl-containing esters of acrylic acid or methacrylic acid, or a mixture of such monomers. Examples include the following: hydroxyalkyl esters of acrylic acid, such as hydroxyethyl acrylate, hydroxypropyl acrylate, hydroxybutyl acrylate, especially 4-hydroxybutyl acrylate; hydroxyalkyl esters of methacrylic acid, such as hydroxyethyl methacrylate, hydroxypropyl methacrylate, hydroxybutyl methacrylate, especially 4-hydroxybutyl methacrylate; reaction products of cyclic esters, such as E-caprolactone, and hydroxyalkyl esters of acrylic and/or methacrylic acid, for example.

The composition of component (a) is preferably selected so that in the case of polymerization of component (a) alone a polyacrylate resin having a glass transition temperature of from −50 to +70, preferably from −30 to +50° C. is obtained. The glass transition temperature may be calculated approximately by the skilled worker with the aid of the formula $$1/T_G = \sum_{n=1}^{n=x} W_n/T_{Gn}$$

As component (b) it is possible in principle to use any non-(a) aliphatic or cycloaliphatic ester of acrylic acid or methacrylic acid having at least 4 carbon atoms in the alcohol residue, or a mixture of such monomers. Examples include the following: aliphatic esters of acrylic and methacrylic acid having from 4 to 20 carbon atoms in the alcohol residue, such as n-butyl, isobutyl, tert-butyl, 2-ethylhexyl, stearyl and lauryl acrylate and methacrylate, and cycloaliphatic esters of acrylic and methacrylic acid, such as cyclohexyl acrylate and cyclohexyl methacrylate, for example. The composition of component (b) is preferably selected so that in the case of polymerization of component (b) alone a polyacrylate resin having a glass transition temperature of from 10 to 100, preferably from 20 to 60° C. is obtained.

As component (c) it is possible in principle to use any ethylenically unsaturated carboxylic acid or a mixture of ethylenically unsaturated carboxylic acids. As component (c) it is preferred to use acrylic acid and/or methacrylic acid.

As component (d) it is possible in principle to use any non-(a), -(b) and -(c) ethylenically unsaturated monomer, or a mixture of such monomers. Examples of monomers which may be used as component (d) include the following: vinylaromatic hydrocarbons, such as styrene, alpha-alkylstyrene and vinyltoluene, amides of acrylic acid and methacrylic acid, such as methacrylamide and acrylamide, nitriles of methacrylic acid and acrylic acid; vinyl ethers and vinyl esters or polysiloxane macromonomers, as described in the patents DE-A-38 07 571, DE-A 37 06 095, EP-B-0 358 153, US-A 4,754,014, DE-A 44 21 823 or WO 92/22615. As component (d) it is preferred to use vinylaromatic hydrocarbons, especially styrene. The composition of component (d) is preferably selected so that in the case of polymerization of component (d) alone a resin having a glass transition temperature of from 70 to 120, preferably from 80 to 100° C. is obtained.

Advantageously, the binders are present in the coating material in an amount of from 10 to 90% by weight, with particular preference from 15 to 80% by weight, and in particular from 20 to 70% by weight, based in each case on the overall amount of the coating material.

The coating material further comprises at least one crosslinking agent.

Where the coating material is a multicomponent system, polyisocyanates and/or polyepoxides, but especially polyisocyanates, are used as crosslinking agents.

Examples of suitable polyisocyanates are the above-described diisocyanates Ia) and/or their oligomers Ib) and/or trimers Ib).

Further examples of suitable polyisocyanates are organic polyisocyanates, especially those known as paint polyisocyanates, having free isocyanate groups attached to aliphatic, cycloaliphatic, araliphatic and/or aromatic moieties. Preference is given to using polyisocyanates having from 2 to 5 isocyanate groups per molecule and having viscosities of from 100 to 10000, preferably from 100 to 5000, and in particular from 100 to 2000 mPas (at 23° C.). If desired, small amounts of organic solvent may be added to the polyisocyanates, preferably from 1 to 25% by weight, based on straight polyisocyanate, in order thus to improve the ease of incorporation of the isocyanate and, where appropriate, to lower the viscosity of the polyisocyanate to a level within the abovementioned ranges. Examples of suitable solvent additives [lacuna] the polyisocyanates are ethoxyethyl propionate, amyl methyl ketone, and butyl acetate. Moreover, the polyisocyanates may have been modified to make them hydrophilic or hydrophobic, in a customary and known manner.

Also suitable, for example, are the isocyanato-containing polyurethane prepolymers which can be prepared by reacting polyols with an excess of polyisocyanates and which are preferably of low viscosity.

Further examples of suitable polyisocyanates are polyisocyanates containing isocyanurate, biuret, allophanate, iminooxadiazinedone, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexyl-methane 2,4'-diisocyanate or dicyclohexylmethane 4,4'-diisocyanate, diisocyanates derived from dimer fatty acids, as sold under the commercial designation DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Further examples of suitable isocyanates are described in Methoden der organischen Chemie, Houben-Weyl, Volume 14/2, 4th Edition, Georg Thieme Verlag, Stuttgart 1963, pages 61 to 70, W. Siefken, Liebigs Ann. Chem. 562, 75 to 136, the European patent EP-A-101 832, or the U.S. Pat. Nos. 3,290,350, 4,130,577, and 4,439,616.

Examples of suitable polyepoxides are all known aliphatic and/or cycloaliphatic and/or aromatic polyepoxides, based for example on bisphenol A or bisphenol F. Examples of further suitable polyepoxides include the polyepoxides obtainable commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether).

In the case of the one-component systems, crosslinking agents are used which react at relatively high temperatures with the functional groups of the binders in order to build up a three-dimensional network. Of course, such crosslinking agents may be used as well in minor amounts in the multicomponent systems. In the context of the present invention, "minor amount" means a fraction which does not disrupt, let alone prevent entirely, the main crosslinking reaction.

Examples of suitable crosslinking agents of this kind are blocked polyisocyanates. Examples of suitable polyisocyanates are those described above.

Examples of suitable blocking agents are the blocking agents known from the U.S. Pat. No. 4,444,954.

As crosslinking agents it is also possible to use tris (alkoxycarbonylamino)triazines of the general formula

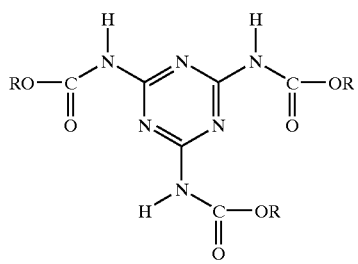

Examples of suitable tris(alkoxycarbonylamino)triazines are described in the patents U.S. Pat. Nos. 4,939,213, 5,084,541 or EP-A-0 624 577. Use is made in particular of the tris(methoxy-, tris(butoxy- and/or tris(2-ethylhexoxycarbonylamino)triazines.

The methyl butyl mixed esters, the butyl 2-ethylhexyl mixed esters, and the butyl esters are of advantage. They have the advantage over the straight methyl ester of better solubility in polymer melts, and also have less of a tendency to crystallize.

In particular it is possible to use amino resins, for example, melamine resins, as crosslinking agents. In this context it is possible to use any amino resins suitable for transparent topcoat materials or clearcoat materials, or a mixture of such amino resins. Particularly suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207.

Further examples of suitable crosslinking agents are beta-hydroxyalkylamides such as N,N,N',N'-tetrakis-(2-hydroxyethyl)adipamide or , N,N,N',N'-tetrakis-(2-hydroxypropyl)adipamide.

Further examples of suitable crosslinking agents are siloxanes, especially siloxanes containing at least one trialkoxy- or dialkoxysilane group.

Further examples of suitable crosslinking agents are polyanhydrides, especially polysuccinic anhydride.

The amount of the crosslinking agents in the coating material may vary widely and is guided in particular firstly by the functionality of the crosslinking agents and secondly by the number of crosslinking functional groups present in the binder, and also by the target crosslinking density. The skilled worker is therefore able to determine the amount of the crosslinking agents on the basis of his or her general knowledge in the art, with or without the assistance of simple rangefinding tests. Advantageously, the crosslinking agent is present in the coating material in an amount of from five to 60% by weight, with particular preference from 10 to 50% by weight, and in particular from 15 to 45% by weight, based in each case on the overall solids content of the coating material. In this context it is advisable, furthermore, to choose the amounts of crosslinking agent and binder such that in the coating material the ratio of functional groups in the crosslinking agent to functional groups in the binder is from 2:1 to 1:2, preferably from 1.5:1 to 1:1.5, with particular preference from 1.2:1 to 1:1.2, and in particular from 1.1:1 to 1:1.1.

The coating material is preferably a nonaqueous coating material, preferably a nonaqueous, transparent gloss clearcoat material. The term gloss clearcoat material indicates that a very high gloss is aimed for, in contrast to the matt coating materials.

Nonaqueous coating materials contain from 20 to 70% by weight, preferably from 40 to 60% by weight (based on the application-ready coating material), of organic solvents, such as aliphatic, aromatic and/or cycloaliphatic hydrocarbons, alkyl esters of acetic acid or propionic acid, alkanols, ketones, glycol ethers and/or glycol ether esters.

The coating material may further comprise at least one customary and known coatings additive in effective amounts, i.e., in amounts of preferably up to 40% by weight, with particular preference up to 30% by weight, and in particular up to 20% by weight, based in each case on the overall solids content of the coating material. It is important that the coatings additives do not adversely affect the transparency and clarity of the coating material.

Examples of suitable coatings additives are

UV absorbers;

light stabilizers such as HALS compounds, benzotriazoles or oxalanilides;

free-radical scavengers;

crosslinking catalysts such as dibutyltin dilaurate or lithium decanoate;

slip additives;

polymerization inhibitors;

defoamers;

emulsifiers, especially nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes;

adhesion promoters such as tricyclodecanedimethanol;

leveling agents;

film formation auxiliaries such as cellulose derivatives;

transparent fillers such as nanoparticles based on silicon dioxide, aluminum oxide or zirconium oxide; for further details, refer to Rompp Lexikon "Lacke und Druckfarben", Georg Thieme Verlag, Stuttgart, 1998, pages 250 to 252;

rheology control additives such as those known from the patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups, such as polyvinyl alcohol, poly(meth) acrylamide, poly(meth)acrylic acid, polyvinylpyrrolidone, styrene-maleic anhydride or ethylene-maleic anhydride copolymers and their derivatives, or hydrophobically modified ethoxylated urethanes or polyacrylates;

flame retardants and/or flatting agents.

Further examples of suitable coatings additives (a6) are described in the textbook "Lackadditive" [Additives for coatings] by Johan Bieleman, Wiley-VCH, Weinheim, N.Y., 1998.

The invention additionally provides a process for preparing a coating material of the invention, wherein:

A) a binder is prepared,

B) the urea derivative for use in accordance with the invention is prepared in the presence of at least a portion of the binder from stage A), and C) the mixture of binder and urea derivative is mixed if desired, with a paste of a silica containing a first portion of a binder which is optionally different than the binder from stage A), preferably a polyacrylate resin of the type described above, with a crosslinking agent or a mixture of crosslinking agents and, optionally, with at least one of the above-described coatings additives, with polyacrylate-compatible binders different than the binders indicated above, and if desired, with the remaining portion of the silica pasted with the binder and adjusted to a customary processing viscosity.

In this case, the crosslinking agent or the mixture of crosslinking agents may be added simultaneously or not until immediately before an application of the coating material. In the case of two-component systems, the crosslinking agent, unblocked polyisocyanates for example, is not added until immediately before the application of the coating material. In the case of one-component systems the crosslinking agent, blocked polyisocyanates for example, may already have been added by the manufacturer.

The invention further provides for the use of a coating material of the invention for producing a gloss clearcoat over a color and/or effect basecoat, especially a basecoat produced using an aqueous basecoat material. Coloring is achieved by means of dyes and/or color pigments. Effect is achieved using effect pigments such as metallic effect pigments or mica pigments.

Examples of suitable aqueous basecoat materials and the corresponding coatings are known from the patents

| EP-A-0 089 497, | EP-A-0 256 540, | EP-A-0 260 447, |
| EP-A-0 297 576, | WO 96/12747, | EP-A-0 523 610, |
| EP-A-0 228 003, | EP-A-0 397 806, | EP-A-0 574 417, |
| EP-A-0 531 510, | EP-A-0 581 211, | EP-A-0 708 788, |
| EP-A-0 593 454, | DE-A-43 28 092, | EP-A-0 299 148, |
| EP-A-0 394 737, | EP-A-0 590 484, | EP-A-0 234 362, |
| EP-A-0 234 361, | EP-A-0 543 817, | WO 95/14721, |
| EP-A-0 521 928, | EP-A-0 522 420, | EP-A-0 522 419, |
| EP-A-0 649 865, | EP-A-0 536 712, | EP-A-9 596 460, |
| EP-A-0 596 461, | EP-A-0 584 818, | EP-A-0 669 356, |

-continued

| EP-A-0 634 431, | EP-A-0 678 536, | EP-A-0 354 261, |
| EP-A-0 424 705, | WO 97/49745, | WO 97/49747, |
| EP-A-0 401 565, | EP-B-0 730 613 or | WO 95/14721. |

The invention provides finally a process for producing a multicoat color and/or effect coating system on a surface of primed or unprimed substrates, which comprises (1) applying a basecoat material provided with color and/or effect pigments, especially an aqueous basecoat material, to the substrate surface, (2) drying the basecoat film applied in stage (1) at temperatures between 15° C. and 100° C., preferably between 20° C. and 85° C., (3) applying to the basecoat film dried in stage (2) a transparent coating material of the invention as a clearcoat film, and subsequently (4) baking basecoat film and clearcoat film together, preferably at temperatures between 120° C. and 180° C. and in a period of from 5 minutes to 60 minutes.

Suitable coating substrates include all surfaces of articles which are amenable to curing of the coating films present thereon using heat; examples include articles made of metals, plastics, wood, ceramic, stone, textile, fiber composites, leather, glass, glass fibers, glass wool and rock wool, or mineral- and resin-bound building materials, such as plasterboard and cement slabs or roof tiles. Accordingly the coating material, especially as a clearcoat material, is highly suitable for applications in automotive finishing, in the coating of furniture and in industrial coating, including coil coating and container coating. In the context of the industrial coatings, it is suitable for coating virtually all parts for private or industrial use, such as radiators, domestic appliances, small metal parts, hub caps or wheel rims.

With the coating material, especially the clearcoat material, it is also possible in particular to paint primed or unprimed plastics, and also plastics which may have been coated with a basecoat film, such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations according to DIN 7728T1). The plastics to be coated may of course also be polymer blends, modified plastics or fiber reinforced plastics. The coating material may also be used to coat plastics which are commonly used in vehicle construction, especially motor vehicle construction. Nonfunctionalized and/or apolar substrate surfaces may be subjected prior to coating in a known manner to a pretreatment, such as with a plasma or by flaming.

In the multicoat systems produced with the aid of a coating material, especially the clearcoat material, no delamination owing to deficient intercoat adhesion is observed. Their leveling and their optical properties are outstanding. Additionally, they no longer tend toward blushing after condensation exposure.

PREPARATION EXAMPLES

Below, preparation examples are given for a coating material using the thixotropic agent of the invention, specifically ureas based on 1,3- or 1,4-bis-(isocyanatomethyl) cyclohexane.

EXAMPLE 1

Preparation of a Polyacrylate Resin Solution

A steel vessel with monomer feed, initiator feed, thermometer, oil heating and reflux condenser was charged with 878 parts of a commercial aromatic solvent having a boiling range of 158° C.–172° C. and this initial charge was heated to 140° C. Then a mixture (a) of 87 parts of the aromatic solvent and 87 parts of t-butyl peroctoate was added with stirring at a rate such that the addition of the mixture (a) was over after 4.75 hours. 15 minutes after beginning the addition of the mixture (a), a mixture (b) consisting of 630 parts of t-butyl acrylate, 217 parts of n-butyl methacrylate, 72 parts of i-butyl methacrylate, 116 parts of styrene, 326 parts of hydroxypropyl methacrylate and 87 parts of 1,4-butanediol monoacrylate was added to the reaction mixture at a rate such that the addition of the mixture (b) was over after 4 hours. Following the end of the addition of the mixture (a), the reaction mixture was held at 140° C. for 2 hours more and then cooled to room temperature. The resulting acrylate resin solution had a solids content of 62.3% (1 h, 130° C.; forced air oven), a viscosity of 7.2 dPas (ICI cone and plate viscometer, 23° C.), an acid number of 4.9 and a hydroxyl number of 111, based in each case on the solids content.

EXAMPLE 2
Preparation of a Polyacrylate Resin Solution Containing Thixotropic Agent 1850 g of the acrylate resin solution described in example 1, 130 g of n-butyl acetate and 61 g of n-hexylamine were weighed out in that order into the 2.5l stirred vessel of a dissolver having a dissolver disk with a diameter of 90 mm. In an initial charge vessel, 130 g of n-butyl acetate and 58 g of 1,4-bis-(isocyanatomethyl)cyclohexane were weighed out and premixed. Dissolver treatment was carried out at 1400 rpm, and the contents of the initial charge were metered into the stirred vessel at a uniform rate over the course of 10 minutes. The dissolver was then operated at 1400 rpm for 20 minutes more. This gave a thixotropic dispersion having a nonvolatile content of 50%, including 5% urea particles.

EXAMPLE 3
Preparation of a Clearcoat Material

The following components were weighed out in the order stated, and mixed by stirring, in a 2 l stirring vessel: 532.5 g of the acrylate resin solution described in example 1, 360 g of the thixotropic dispersion described in example 2, 342 g of a commercial butanol-etherified melamine resin, dissolved 80% in n-butanol, 18 g of a commercial UV absorber based on a benzotriazole, dissolved in 45 g of xylene, 15 g of a commercial free-radical scavenger based on a sterically hindered piperidine derivative, dissolved in 30 g of xylene, 15 g of a commercially modified polysiloxane as leveling agent, 60 g of n-butanol and 91.5 g of the aromatic solvent described in example 1.

The resulting clearcoat material of the invention exhibited a pronounced pseudoplastic rheology, which had a very beneficial effect on the application properties and the leveling of the clearcoat material. The clearcoats produced using the clearcoat material of the invention had outstanding optical properties and were suitable to a high degree for the production of multicoat color and/or effect paint systems by the wet-on-wet technique.

What is claimed is:

1. A thixotropic agent comprising a reaction product of an isocyanato-containing compound and an amine,
   wherein the amine comprises at least one of a primary amine and a secondary amine, and optionally wherein the amine further comprises water,
   wherein the isocyanato-containing compound comprises at least one of Ia) at least one isocyanate containing at least one diisocyanate structural unit that
      i) has a ring structure containing 5–10 ring atoms, wherein the ring structure is one of unsaturated/aromatic and non-aromatic, and
      ii) has two isocyanate groups attached to the ring structure,
      iii) wherein when the ring structure is the non-aromatic ring structure, at least one of
         a) both isocyanate groups are attached to the ring structure via at least one of linear $C_1$–$C_9$ alkyl and linear $C_2$–$C_{10}$ ether alkyl, and
         b) one isocyanate group is attached directly to the ring structure and the other is attached via one of linear $C_2$–$C_9$ alkyl and linear $C_2$–$C_{10}$ ether alkyl, and
      iv) wherein when the ring structure is the unsaturated/aromatic ring structure, at least one of the two isocyanate groups is attached to the ring structure via at least one of linear $C_2$–$C_9$ alkyl and linear $C_2$–$C_{10}$ ether alkyl, neither the linear $C_2$–$C_9$ alkyl nor the linear $C_2$–$C_{10}$ ether alkyl contain benzylic hydrogen atoms;
   Ib) at least one oligomer of the isocyanate Ia) containing from 2 to 10 isocyanate units; and
   Ic) at least one of a partially blocked isocyanate Ia) and a partially blocked oligomer Ib).

2. The thixotropic agent of claim 1, wherein the amine comprises an aliphatic, primary monoamine.

3. The thixotropic agent of claim 1, wherein the isocyanato-containing compound comprises the Ia isocyanate and the Ib isocyanate.

4. The thixotropic agent of claim 1, wherein the ring structure is heteroatomic and comprises at least one heteroatom that is at least one of nitrogen, oxygen, and silicon.

5. The thixotropic agent of claim 1, wherein the ring structure comprises at least one of cyclohexane, benzene, silacyclopentane, silacyclohexane, oxolane, oxane, dioxane, morpholine, pyrrolidine, imidazofidine, pyrazolidine, piperidiene, quinuclidine, pyrrole, imidazole, pyrazole, pyridine, pyrimidine, pyrazine, pyridazine, triazine, terpene, decalin, adamantane, quinuclidine, carane, norcarane, pinane, camphane, and norbomane.

6. The thixotropic agent of claim 1, wherein at least one hydrogen atom of the diisocyanate structural unit is substituted by one of nitro, alkyl, cycloalkyl, perfluoroalkyl, perfluorocycloalkyl, aryl, and halogen.

7. A method comprising adding the thixotropic agent of claim 1 to a coating material.

8. The method of claim 7, wherein the coating material comprises a binder, a crosslinking agent, and optionally, a coatings additive.

9. The method of claim 8, wherein the crosslinking agent is selected from the group consisting of polyisocyanates, polyepoxides, block polyisocyanates, tris(alkoxycarbonylamino)triazines, amino resins, beta-hydroxyalkylamides, siloxanes, polyanhydrides, and mixtures thereof.

10. The method of claim 7, wherein at least one of
   a. the amine comprises an aliphatic, primary monoamine;
   b. the isocyanato-containing compound comprises the Ia isocyanate and the Ib Isocyanate;
   c. the ring structure is heteroatomic and comprises at least one heteroatom that is at least one of nitrogen, oxygen, and silicon;
   d. the ring structure comprises at least one of cyclohexane, benzene, silacyclopentane, silacyclohexane, oxolane, oxane, dioxane, morpholine, pyrrolidine, imidazolidine, pyrazolidine, piperidiene, quinuclidine, pyrrole, imidazole, pyrazole, pyridine, pyrimidine, pyrazine, pyridazine, triazine, terpene, decalin, adamantane, quinuclidine, carane, norcarane, pinane, camphane, and norbomane; and e. at least one hydrogen atom of the diisocyanate structural unit is substituted by one of nitro, alkyl, cycloalkyl, perfluoroalky, perfluorocycloalkyl, aryl, and halogen.

11. A process for preparing the thixotropic agent of claim 1, comprising
  a) adding the amine to a binder solution,
  b) adding the isocyanato-containing compound, and
  c) allowing the amine and isocyanto-containing compound to react.

12. The process of claim 11, wherein at least one of stages a) and b) are conducted with stirring.

13. The process of claim 11, wherein at least one of
  a. the amine comprises an aliphatic, primary monoamine;
  b. the isocyanato-containing compound comprises the Ia isocyanate and the Ib isocyanate;
  c. the ring structure is heteroatomic and comprises at least one heteroatom that is at least one of nitrogen, oxygen, and silicon;
  d. the ring structure comprises at least one of cyclohexane, benzene, silacyclopentane, silacyclohexane, oxolane, oxane, dioxane, morpholine, pyrrolidine, imidazolidine, pyrazolidine, piperidiene, quinuclidine, pyrrole, imidazole, pyrazole, pyridine, pyrimidine, pyrazine, pyridazine, triazine, terpene, decalin, adamantane, quinuclidine, carane, norcarane, pinane, camphane, and norbomane; and
  e. at least one hydrogen atom of the diisocyanate structural unit is substituted by one of nitro, alkyl, cycloalkyl, perfluoroalkyl, perfluorocycloalkyl, aryl, and halogen.

14. A thixotropic agent comprising a reaction product of an isocyanato-containing compound and an amine,
  wherein the amine comprises at least one of a primary amine and a secondary amine, and optionally wherein the amine further comprises water,
  wherein the isocyanato-containing compound comprises at least one of
    Ia) at least one isocyanate containing at least one diisocyanate structural unit that
      i) has a ring structure containing 5–10 ring atoms, wherein the ring structure is one of unsaturated/aromatic and non-aromatic, and
      ii) has two isocyanate groups attached to the ring structure,
      iii) wherein when the ring structure is the non-aromatic ring structure, at least one of
        a) both isocyanate groups are attached to the ring structure via at least one of linear $C_1$–$C_9$ alkyl and linear $C_2$–$C_{10}$ ether alkyl, and
        b) one isocyanate group is attached directly to the ring structure and the other is attached via linear $C_2$–$C_{10}$ ether alkyl, and
      iv) wherein when the ring structure is the unsaturated/aromatic ring structure, at least one of the two isocyanate groups is attached to the ring structure via at least one of linear $C_2$–$C_9$ alkyl and linear $C_2$–$C_{10}$ ether alkyl, neither the linear $C_2$–$C_9$ alkyl nor the linear $C_2$–$C_{10}$ ether alkyl contain benzylic hydrogen atoms;
    Ib) at least one oligomer of the isocyanate Ia) containing from 2 to 10 isocyanate units; and
    Ic) at least one of a partially blocked isocyanate Ia) and a partially blocked oligomer Ib).

15. A thixotropic agent comprising a reaction product of an isocyanato-containing compound and an amine,
  wherein the amine comprises at least one of a primary amine and a secondary amine, and optionally wherein the amine further comprises water,
  wherein the isocyanato-containing compound comprises at least one of
    Ia) at least one isocyanate containing at least one diisocyanate structural unit that
      i) has a ring structure containing 5–10 ring atoms and at least one heteroatom that is at least one of nitrogen, oxygen, and silicon, wherein the ring structure is one of unsaturated/aromatic and non-aromatic, and
      ii) has two isocyanate groups attached to the ring structure,
      iii) wherein when the ring structure is the non-aromatic ring structure, at least one of
        a) both isocyanate groups are attached to the ring structure via at least one of linear $C_1$–$C_9$ alkyl and linear $C_2$–$C_{10}$ ether alkyl, and
        b) one isocyanate group is attached directly to the ring structure and the other is attached via one of linear $C_2$–$C_9$ alkyl and linear $C_2$–$C_{10}$ ether alkyl, and
      iv) wherein when the ring structure is the unsaturated/aromatic ring structure, at least one of the two isocyanate groups is attached to the ring structure via at least one of linear $C_2$–$C_9$ alkyl and linear $C_2$–$C_{10}$ ether alkyl, neither the linear $C_2$–$C_{10}$ alkyl nor the linear $C_2$–$C_{10}$ ether alkyl contain benzylic hydrogen atoms;
    Ib) at least one oligomer of the isocyanate Ia) containing from 2 to 10 isocyanate units; and
    Ic) at least one of a partially blocked isocyanate Ia) and a partially blocked oligomer Ib).

16. A thixotropic agent comprising a reaction product of an isocyanato-containing compound and an amine,
  wherein the amine comprises at least one of a primary amine and a secondary amine, and optionally wherein the amine further comprises water,
  wherein the isocyanato-containing compound comprises at least one of
    Ia) at least one isocyanate containing at least one diisocyanate structural unit that
      i) has a ring structure containing 5–10 ring atoms and at least one hydrogen atom of the diisocyanate structural unit is substituted by one of nitro, alkyl, cycloalkyl, perfluoroalkyl, perfluorocycloalkyl, aryl, and halogen, wherein the ring structure is one of unsaturated/aromatic and non-aromatic, and
      ii) has two isocyanate groups attached to the ring structure,
      iii) wherein when the ring structure is the non-aromatic ring structure, at least one of
        a) both isocyanate groups are attached to the ring structure via at least one of linear $C_1$–$C_9$ alkyl and linear $C_2$–$C_{10}$ ether alkyl and
        b) one isocyanate group is attached directly to the ring structure and the other is attached via one of linear $C_2$–$C_9$ alkyl and linear $C_2$–$C_{10}$ ether alkyl, and iv) wherein when the ring structure is the unsaturated/aromatic ring structure, at least one of the two isocyanate groups is attached to the ring structure via at least one of linear $C_2$–$C_9$ alkyl and linear $C_2$–$C_{10}$ ether alkyl, neither the linear $C_2$–$C_9$ alkyl nor the linear $C_2$–$C_{10}$ ether alkyl contain benzylic hydrogen atoms;

Ib) at least one oligomer of the isocyanate Ia) containing from 2 to 10 isocyanate units; and Ic) at least one of a partially blocked isocyanate Ia) and a partially blocked oligomer Ib).

* * * * *